Dec. 7, 1926.
W. LEWIN
GRAPHIC BAROMETER
Filed June 2, 1925
1,609,647
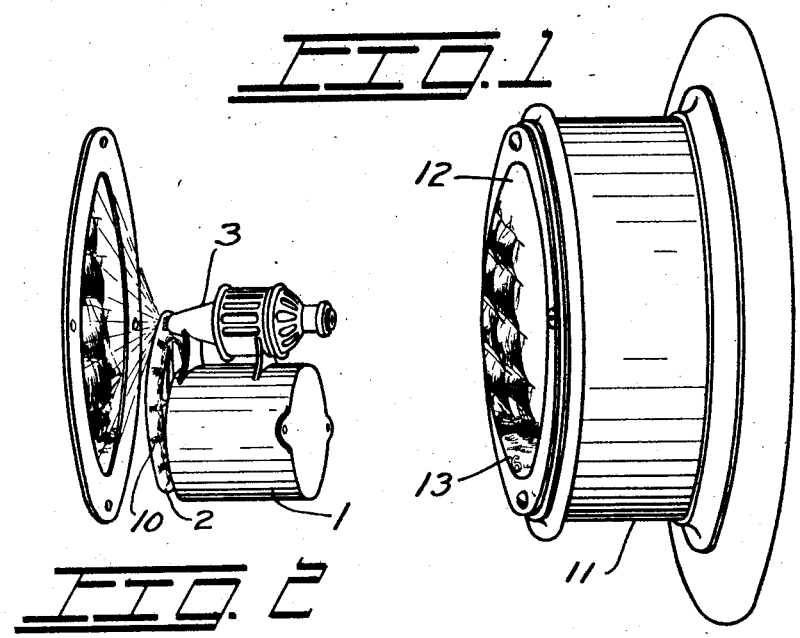
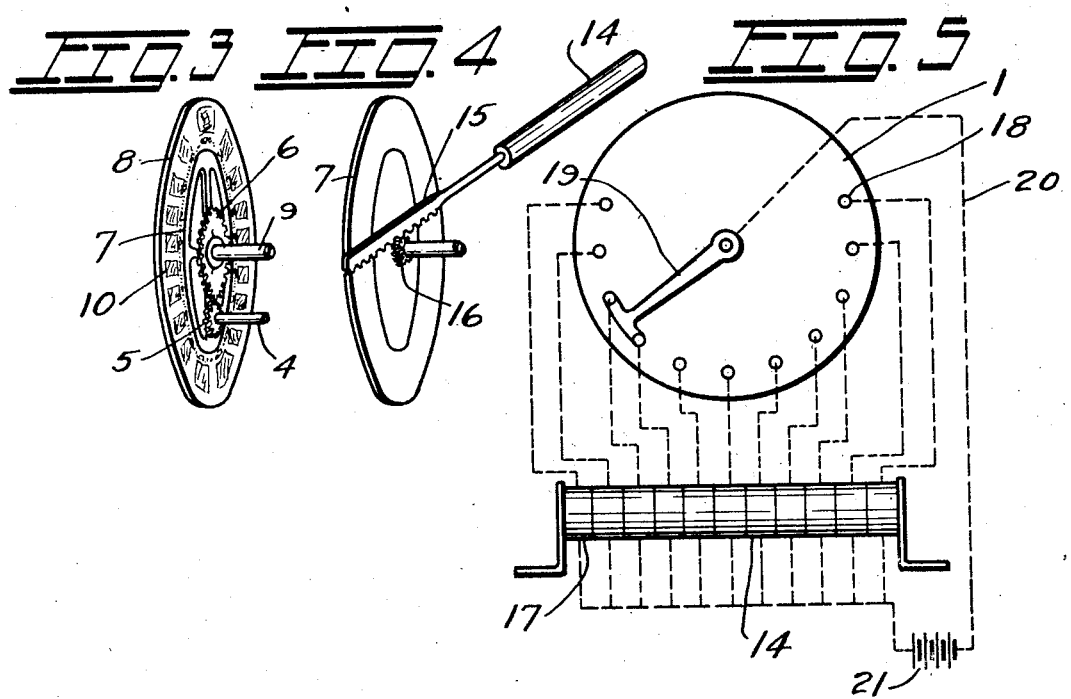
INVENTOR
Walter Lewin
BY
Harry Bowen
ATTORNEY Patented Dec. 7, 1926.

1,609,647

UNITED STATES PATENT OFFICE.

WALTER LEWIN, OF BELLEVUE, WASHINGTON.

GRAPHIC BAROMETER.

Application filed June 2, 1925. Serial No. 34,433.

The invention is a weather forecasting instrument in which graphic representations of a ship or other object or of conditions of the weather are automatically portrayed.

The object of the invention is to provide a weather forecasting instrument which automatically portrays graphic representations of a ship or other object, or different conditions of the weather.

Another object of the invention is to provide a means for attaching an aneroid barometer to a plurality of miniature pictures so that the pictures will be brought into different positions as the barometer operates.

And a further object of the invention is to provide a means for projecting miniature pictures in combination with an aneroid barometer for moving the said pictures.

With these ends in view, the invention embodies an aneroid barometer, a plurality of representations of a ship or the like in combination therewith and being arranged so that they will move in different positions as the barometer operates, a projector for throwing the said representations on an enlarged surface and a suitable casing for the said barometer and projector.

Other features and advantages of the invention will appear from the following description, taken in connection with the drawings, wherein:—

Figure 1 is an exterior view of the casing.

Figure 2 is a view showing the arrangement of the aneroid barometer, the projector and the screen.

Figure 3 is a view showing the gears for operating the discs having the miniature representations thereon.

Figure 4 is a view showing an alternate means for operating the disc.

Figure 5 is a diagrammatic view showing the means for operating the soleonid.

In the drawings I have shown my device as it would be made wherein numeral 1 indicates an aneroid barometer, numeral 2, a disc upon which miniature pictures are placed and numeral 3 a projector.

The barometer 1 may be of any suitable type or design and may be arranged in any suitable manner. In the design shown the indicator shaft, which is indicated by the numeral 4, as shown in Figure 3, projects beyond the casing and on the end of the shaft is a pinion 5 that meshes with a gear 6 on a wheel 7 that has a film 8 around its outer edge and the wheel 7 and gear 6 are mounted upon a shaft 9. It will be observed that as the indicator shaft 4 rotates by the action of the barometer, it will, in turn, rotate the disc or wheel 7. On the film 8, are miniature pictures 10 which may illustrate different arrangements of the sails of a ship or different conditions of weather to indicate how the sails should be arranged for the different conditions of weather or illustrating storms, winds or sunshine to portray the different conditions of weather, and it will be observed that these miniature pictures may be arranged in combination with the barometer so that as any particular condition of the weather is approaching, the barometer will move the miniature picture disclosing how the ship should be arranged for this particular condition of the weather to the visible position.

A projector 3 may also be used in combination with the barometer to project the miniature picture on the film upon a screen or lens as shown in Figures 1 and 2. This projector may be of any suitable type and may be arranged in any suitable manner to project the picture as may be desired.

The barometer, film disc and projector may be enclosed in a casing 11 having a screen 12 in its face as shown. The picture will be projected upon the screen as shown and the degrees may also be projected on the lower edge of the screen as indicated by the numeral 13, as the degrees may be placed on the film below the miniature pictures.

An alternate design is shown in Figures 4 and 5 in which the disc 7 is operated by a solenoid 14 through a rack 15 and a pinion 16 that may be placed on the inner side of the disc 7. The solenoid may be divided into sections 17 and each section connected by suitable wires to contact points 18 on the face of the barometer and it will be observed that the indicating arm 19 of the barometer will engage these contact points to complete circuits through the sections of the solenoid. The contact point 19 is connected by a wire 20 to each of the sections and the wire 20 may be connected to a battery 21 or to any suitable source of electric current. It will be observed that the sections 17 may be arranged and connected in such a manner that as the different points are engaged by the lever 19, the rack 15 will move into or out of the solenoid and thereby operate the disc 7 to display the picture that will portray a symbol indicating the condition of the weather.

It will be understood that changes may be made in the construction without departing from the spirit of the invention. One of these changes may be in the type of barometer used, another may be in the connection between the barometer and the film disc, another may be in the arrangement or size of the film disc, another may be in the type of projector used or in the means for projecting the pictures and still another may be in the design or type of screen used or in the omission of the screen and projector so that the pictures may be observed through a small opening.

Having thus fully described the invention, what I claim as new and desire to secure by Letters Patent, is:—

1. In a weather forecasting instrument, a continuous rotary film, said film having graphic representations of an object or of different conditions of weather thereon, an aneroid barometer, suitable gears connecting the said barometer to the said film to cause the film to rotate as the barometer operates, a lamp in combination with the said film positioned to throw light through the said film, a screen adjacent the said film upon which the representations on the film may be projected by the said lamp, and a suitable casing for enclosing the said device.

2. In a weather forecasting device, a film having graphic representations thereon, means for rotatably mounting the film in a suitable casing, means for automatically rotating the said film as conditions of the weather change, and means within the said casing for projecting the representations on the film upon a surface in the front of the said casing.

3. In a display device for forecasting conditions of weather, a continuous film, means for rotatably supporting the said film, an aneroid barometer, suitable connections between the said barometer and film for automatically rotating the said film as the barometer operates, said film having a plurality of representations thereon, a suitable casing for enclosing the said device, said casing having a translucent surface at one side, and means for projecting the representations on the said film upon the said translucent surface.

WALTER LEWIN.